United States Patent
Mann et al.

(10) Patent No.: US 7,815,621 B2
(45) Date of Patent: Oct. 19, 2010

(54) RECOVERY SYSTEM

(75) Inventors: Brad Mann, Raleigh, NC (US); Eddie Ballance, Raleigh, NC (US); Allen Grobin, Bahama, NC (US)

(73) Assignee: Eisai R & D Management Co. Ltd. (JP)

( * ) Notice: Subject to any disclaimer, the term of this patent is extended or adjusted under 35 U.S.C. 154(b) by 1089 days.

(21) Appl. No.: 11/176,962

(22) Filed: Jul. 7, 2005

(65) Prior Publication Data

US 2007/0016160 A1 Jan. 18, 2007

(51) Int. Cl.
| | |
|---|---|
| A61B 19/00 | (2006.01) |
| A61M 1/00 | (2006.01) |
| A61M 5/32 | (2006.01) |
| G01N 1/22 | (2006.01) |
| G01N 1/00 | (2006.01) |
| G01N 35/00 | (2006.01) |
| A61B 5/00 | (2006.01) |
| B65D 81/00 | (2006.01) |

(52) U.S. Cl. ............... 604/407; 604/318; 604/411; 604/415; 73/864; 73/864.81; 73/864.91; 600/573

(58) Field of Classification Search ............... 604/319, 604/321, 403, 407, 411, 414, 415; 53/266.1, 53/284.5, 284.6, 392; 422/100, 102, 103, 422/104, 300, 303, 903, 905, 935; 73/863.01, 73/863.32, 863.33, 863.71, 863.73, 863.81, 73/864.14, 864.16, 864.17, 864.23, 864.31, 73/864.34

See application file for complete search history.

(56) References Cited

U.S. PATENT DOCUMENTS

| | | | | |
|---|---|---|---|---|
| 2,962,633 | A | * | 11/1960 | Raymond .................. 361/189 |
| 3,568,735 | A | * | 3/1971 | Lancaster .................. 141/238 |
| 3,807,235 | A | * | 4/1974 | Lefkovits et al. ......... 73/863.32 |
| 3,813,021 | A | * | 5/1974 | Kramer ...................... 228/1.1 |
| 4,106,911 | A | * | 8/1978 | Marcelli ...................... 422/63 |
| 4,528,158 | A | | 7/1985 | Gilles et al. |
| 4,675,163 | A | | 6/1987 | Mybeck |
| 4,861,553 | A | | 8/1989 | Mawhirt et al. |
| 4,874,691 | A | | 10/1989 | Chandler et al. |
| 4,890,930 | A | | 1/1990 | Nohso et al. |
| 4,891,321 | A | | 1/1990 | Hubscher |
| 4,928,539 | A | * | 5/1990 | Champseix et al. ...... 73/864.24 |
| 4,951,512 | A | | 8/1990 | Mazza et al. |
| 4,952,518 | A | | 8/1990 | Johnson et al. |
| 5,037,390 | A | * | 8/1991 | Raines et al. .................. 604/83 |
| 5,055,263 | A | * | 10/1991 | Meltzer ...................... 422/65 |
| 5,114,681 | A | * | 5/1992 | Bertoncini et al. .......... 422/111 |

(Continued)

FOREIGN PATENT DOCUMENTS

WO  WO-2004037708 A2  5/2004

*Primary Examiner*—Leslie R Deak
*Assistant Examiner*—Adam Marcetich
(74) *Attorney, Agent, or Firm*—Wilmer Cutler Pickering Hale and Dorr LLP

(57) ABSTRACT

A system allows for the safe, rapid, efficient recovery of a drug solution from sealed vials. The system is closed so that highly potent compounds can later be recovered and reworked without large investment in further engineering controls. The system includes three main components: a recovery device that holds sealed vials containing a solution, and provides means to access the contents of the vials; a peristaltic pump that pumps solution out of the vials; and a recovery tank that receives the pumped solution.

9 Claims, 2 Drawing Sheets

U.S. PATENT DOCUMENTS

| | | |
|---|---|---|
| 5,163,582 A | 11/1992 | Godolphin et al. |
| 5,240,679 A | 8/1993 | Stettler et al. |
| 5,262,049 A | 11/1993 | Ferkany |
| 5,285,823 A * | 2/1994 | Honda .......................... 141/7 |
| 5,413,000 A | 5/1995 | Stark et al. |
| 5,483,843 A * | 1/1996 | Miller et al. ............. 73/864.23 |
| 5,517,867 A | 5/1996 | Ely et al. |
| 5,558,838 A | 9/1996 | Uffenheimer |
| 5,613,345 A | 3/1997 | Saito et al. |
| 5,653,686 A | 8/1997 | Coulter et al. |
| 5,665,309 A | 9/1997 | Champseix et al. |
| 5,675,227 A | 10/1997 | Roos et al. |
| 5,691,486 A | 11/1997 | Behringer et al. |
| 5,837,203 A | 11/1998 | Godec et al. |
| 5,885,270 A | 3/1999 | Ortiz et al. |
| 6,033,911 A * | 3/2000 | Schultz et al. ................ 436/49 |
| 6,171,555 B1 * | 1/2001 | Cargill et al. ................ 422/104 |
| 6,199,436 B1 | 3/2001 | Morel et al. |
| 6,274,087 B1 * | 8/2001 | Preston et al. ............. 422/100 |
| 6,324,926 B1 | 12/2001 | Lehtinen et al. |
| 6,416,718 B1 * | 7/2002 | Maiefski et al. ............. 422/103 |
| 6,689,108 B2 | 2/2004 | Lavi et al. |
| 6,702,832 B2 | 3/2004 | Ross et al. |
| 6,846,456 B2 * | 1/2005 | Acosta et al. ................. 422/65 |
| 6,852,283 B2 * | 2/2005 | Acosta et al. ................. 422/65 |
| 2005/0074360 A1 * | 4/2005 | DeWalch ..................... 422/63 |
| 2008/0156377 A1 * | 7/2008 | Mann ......................... 137/263 |

* cited by examiner

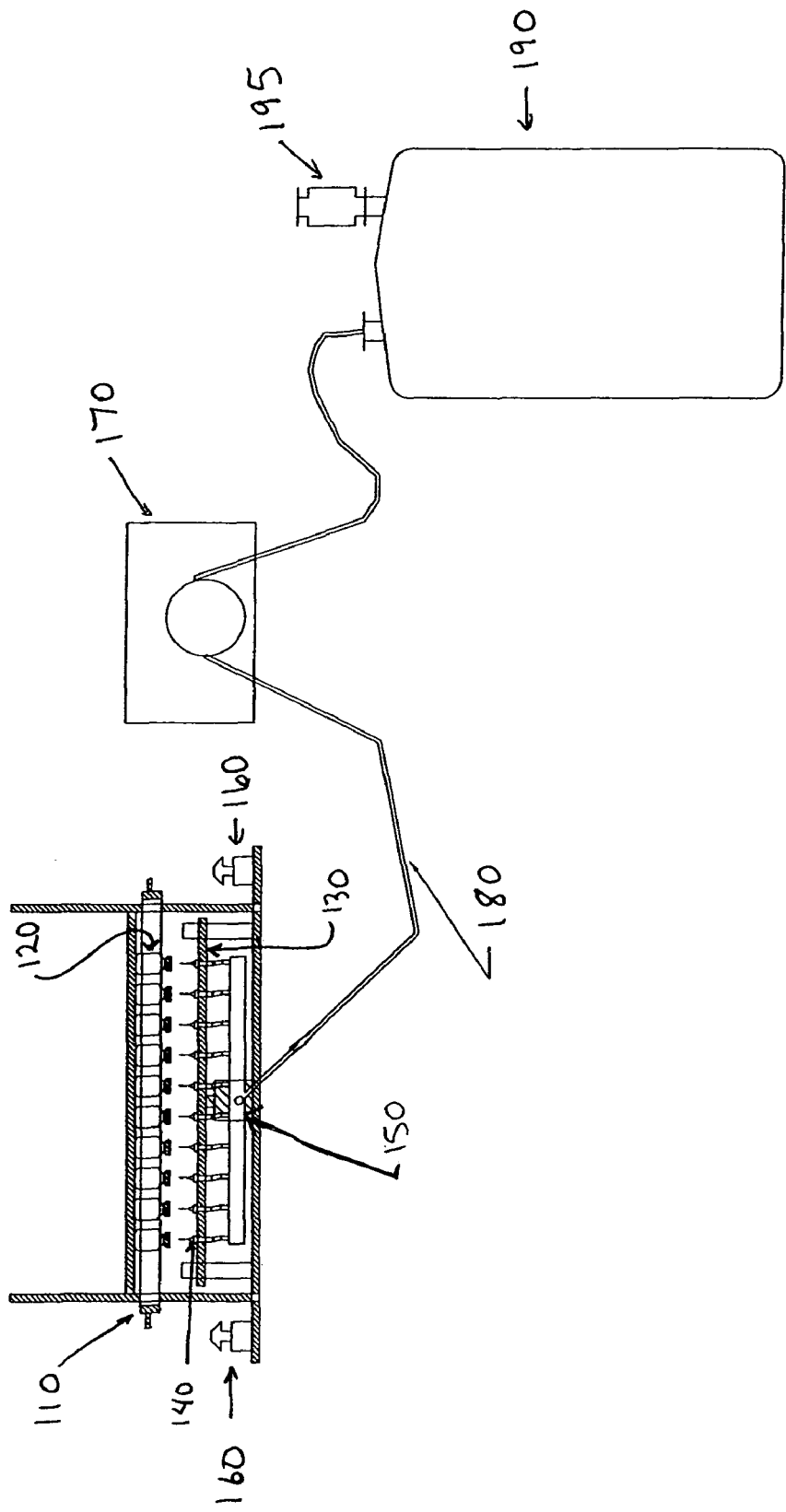

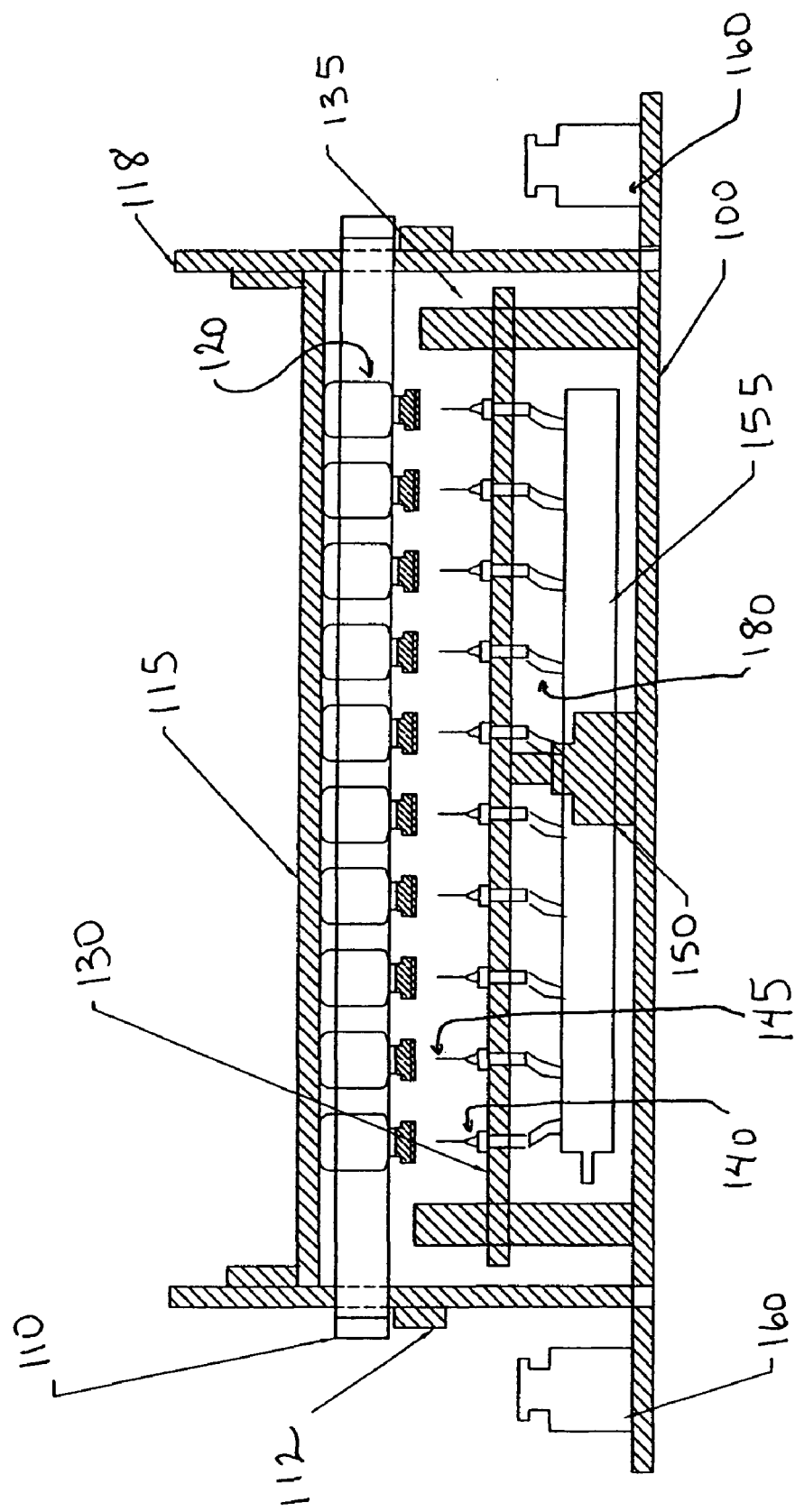

RECOVERY SYSTEM

BACKGROUND

The invention generally relates to methods of recovering material from containers.

The products of the chemical, biotechnological, and pharmaceutical industries can be the result of immense investments of money, time, and effort. Occasionally a manufacturing or human error can create a problem. For example an unsafe contaminant could accidentally be introduced into the product, or a batch of the product could be accidentally packaged into non-sterile containers, where sterility of the product is required for safety. It may be desirable to recover as much of the product as possible, and then purify or sterilize it as appropriate.

SUMMARY

In the embodiments described here, liquid can be recovered from stoppered vials by providing the vials upside down in a holding cassette over upwardly extending hollow needles. The needles puncture the stoppers in the vials and draw the liquid through a manifold to a vessel. The cassette with multiple vials can be manually provided in a holder and manually removed from the holder after the liquid is removed. The recovery process can be initiated with a safety feature that requires two simultaneous actions, such as two buttons to be pushed by two hands to prevent inadvertent actuation. The system preferably uses a peristaltic pump, which is preferably operated with a foot pedal actuation.

Other features and advantages will become apparent from the following detailed description, drawings, and claims.

BRIEF DESCRIPTION OF THE DRAWINGS

FIG. 1 is a schematic diagram showing the components of the recovery system.

FIG. 2 is a detailed diagram of the vial holder and needle assembly.

DETAILED DESCRIPTION

The systems described here are directed to methods of recovering expensive or dangerous materials from sealed containers safely, nearly completely, and with high throughput. They can be used with benign materials or with materials that are unsafe for human contact; it could be toxic, explosive, mutagenic, or carcinogenic, for example, such that human involvement in the recovery process should be kept to a minimum.

FIG. 1 is a schematic diagram showing components of an embodiment of a recovery system. The system has three main components: recovery device 100 that holds sealed vials containing a solution, a peristaltic pump 170 that pumps the solution out of the vials, and a recovery tank 190 that receives the pumped solution. In recovery device 100, vial holder cassette 110 holds solution-containing vials 120 upside down, so the solution flows to the bottom. Vials 120 can be made of any sturdy material, such as glass or plastic, which is preferably transparent so that recovery of the material can be monitored.

Caps or stoppers seal vials 120, preventing the solution from leaking during normal storage and transportation. The stoppers are made of a material that can be pierced with a needle to allow the solution to be withdrawn without removing the stopper. The stopper preferably "re-seals" after being punctured. Rubber is an example of a useful stopper material. These features of the stopper reduce the risks of human contact with a dangerous material, of further contamination, and of losing material during recovery process.

A needle holder 130 securely holds a row of needles 140 directly beneath vials 120. The needles 140 have a hollow bore, and are sufficiently strong to pierce the stoppers of vials 120 without breaking. If a needle does break it can be replaced easily by twisting it off and twisting a new one on. When a user presses two cylinder push buttons 160, an air cylinder 150 raises needle holder 130, preferably to a height where the tips of the needles 140 barely puncture the vial stoppers. This way as solution is drawn out of the vial, the tips of the needles 140 stay immersed in the solution until nearly all of the solution is withdrawn.

Tubing 180 connects each of the needles 140 to peristaltic pump 170 and then to recovery tank 190. Pump 170 is designed such that the solution does not come in contact with internal pump components, but is transmitted via continuous tubing 180 into recovery tank 190. Using such a pump allows the tubing 180 to be sterilized or discarded after the recovery process is completed, and also minimizes the risk of human exposure, contamination of the solution by the pump, contamination of the pump by the solution, and loss of the material into the pump. Recovery tank 190 has a vent filter 195 that allows gases, but not the liquid, to escape, and stores the solution until the user is ready to further process or purify it. In some embodiments, the liquid is reprocessed or purified by any needed means including by heating, filtering, disinfecting light, mixture with other materials, or any other desired process.

FIG. 2 illustrates in greater detail the components of recovery device 100, with the rest of the system as shown in FIG. 1. Vial holder cassette 110 holds the vials 120 stopper side down. A user locks cassette 110 into place in the device, where it is securely held in all three dimensions. Side rails 118 hold cassette 110 in place in the horizontal plane. Vial stop 115 and side rail adjustments 112 hold cassette 110 in place vertically. Vial stop 115 also prevents vials 120 from moving upwardly when the needles puncture the stoppers. Cassette 110 is easily interchangeable, allowing recovery of solution from a large number of vials in a short amount of time. While the cassette is shown with one row of 10 vials, it could be used with other plural numbers of vials in other two-dimensional arrays. The cassette can be manually provided with no system and fixed in place without a carousel or other moving device, although automated moving systems could be used. The vials can have a narrower neck and wider body, unlike a test tube, thereby creating a shoulder that can rest in the cassette.

As described previously, needle holder 130 securely mounts needles 140 to be used for solution recovery. Holder 130 approximately centers each needle tip 145 on the stopper of corresponding vial 120. The device holds needle holder 130 in place in all three dimensions. Guide rods 135 hold needle holder 130 in place in the horizontal plane. The vertical position of air cylinder 150 determines the vertical position of needle holder 130. To adjust the vertical height of 130, i.e. to controllably puncture the vial stoppers with needles 140, the user simultaneously pushes two push buttons 160. Two buttons are provided as a safety measure, in order to keep the user's hands away from the moving needles 140 and to prevent accidental starting. Other safely methods could be used, preferably including two simultaneous actions to start the process. Needle holder 130 stays raised as long as both buttons 160 are pressed, and then lowers when buttons 160 are released. When the user presses buttons 160, a valve (not shown) opens, allowing compressed air at about 100 psi to raise air cylinder 150 to a pre-set height appropriate to the size of vials 120. Once needles 140 pierce the stoppers at the appropriate height, the user activates peristaltic pump 170 with a foot switch (not shown). The needles 140 connect to manifold 155 with tubing 180, which connects to pump 170 via additional tubing 180 as illustrated in FIG. 1.

In one use, mass balances were used to monitor the yield of solution recovery, by weighing the vials before and after recovery, and it was found that the system recovered more than 95% of the material from 2 mL vials. Each cassette holds 10 vials, and by interchanging cassettes the device can be used to recover material from about 2000 vials per hour. The cassette is not limited to this size, and can be made as large or as small as needed to hold the desired size and number of vials. 2 mL is only provided as an example vial size, since it is commonly used for doses of drug solutions. Vials would not need to be used at all, but any container with a section that could be punctured without breaking or leaking could be used.

In the described system the user locks the cassettes into place and controls the needle height, but an automated system for exchanging cassettes and controlling the needle height could be implemented and would allow for even faster throughput of vials. Also, while the described recovery system moves the needles to puncture the vials, the needles could also be held fixed and the vials moved downwardly instead.

A solution is not the only material that can be recovered from sealed vials with the described system. If the vial contains a solid, or a liquid that is too viscous to pump out, the system can be used to introduce into the vial an appropriate solvent that dissolves the material. This is done by switching the recovery tank with a container of the solvent, and setting the pump to operate in reverse. The cassette holds the vials as usual, and the user presses the push buttons to raise the needles up to puncture the stoppers. Then the user activates the pump, which pumps solvent into the vials. This creates a solution suitable for recovery as usual. The user releases the pump and lowers needles, and then switches the system back to its original configuration, and operates it as described above. The switching can be automated.

The needles 140, manifold 155, tubing 180, and recovery tank 190 are the only components that come in contact with the material, and are preferably non-reactive with the material. If the system is used to recover different materials, the tubing, manifold, needles, and tank should be changed for use with each different material to avoid cross-contamination and also potential reactivity. The pump itself does not need to be peristaltic, but any pump that has the functionality of isolating the solution from contamination in the pump could be used.

The system described here can be used with any liquid that should be recovered, including liquids that are expensive and/or potentially harmful, such as anti-cancer drugs.

Other aspects, modifications, and embodiments are within the scope of the following claims.

What is claimed is:

1. An apparatus for recovering a solution from a plurality of stoppered vials, the apparatus comprising:
   a vial holder to hold the plurality of vials stopper side down, the holder being manually movable into and out of a liquid recovery position;
   a plurality of hollow needles capable of puncturing the stoppers of the vials and positioned beneath the vials, the plurality of needles and the holder being movable relative to each other between a lower position in which the needles are spaced from the stoppers of the vials and an upper position in which the needles puncture the stoppers of the vials;
   a pump to extract a solution from the vials;
   a recovery vessel to collect the solution from the vials; and
   tubing connecting the needles to the pump and to the recovery vessel.

2. The apparatus of claim 1, wherein each of the vials has a smaller diameter neck and a wider diameter body to define a shoulder, the vials each resting within the holder such that the shoulder is in contact with the holder to limit downward movement.

3. The apparatus of claim 1, wherein the needles contact a proximal end of the vials, the apparatus further comprising a stop bar for contacting a distal end of the vials to prevent the vials from moving when the vials and needles come into contact.

4. The apparatus of claim 1, where the vial holder is replaceable with a holder holding a next set of vials.

5. The apparatus of claim 1, further comprising user operated actuation controls for the needles to move from the lower position to the upper position, the controls requiring two simultaneous user actions to cause the movement of the holder relative to the needles.

6. The apparatus of claim 5, wherein the controls include two push buttons positioned so that the buttons cannot be operated with one hand.

7. The apparatus of claim 1, where the needles are moved with a pneumatic drive.

8. The apparatus of claim 1, where the pump is activated with a foot pedal.

9. The apparatus of claim 1, where the pump is a peristaltic pump.

* * * * *